(12) United States Patent
Krause et al.

(10) Patent No.: US 8,706,300 B2
(45) Date of Patent: Apr. 22, 2014

(54) METHOD OF CONTROLLING A ROBOTIC TOOL

(75) Inventors: Ken Krause, Rochester Hills, MI (US); Bruce E. Coldren, West Bloomfield, MI (US); Edward Roney, Novi, MI (US); Steven Prehn, Dexter, MI (US); Michael M. Sharpe, Orion, MI (US); Claude Dinsmoor, Rochester Hills, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 194 days.

(21) Appl. No.: 13/146,838

(22) PCT Filed: Feb. 3, 2010

(86) PCT No.: PCT/US2010/023053
§ 371 (c)(1),
(2), (4) Date: Jul. 28, 2011

(87) PCT Pub. No.: WO2010/091086
PCT Pub. Date: Aug. 12, 2010

(65) Prior Publication Data
US 2011/0282492 A1 Nov. 17, 2011

Related U.S. Application Data

(60) Provisional application No. 61/149,443, filed on Feb. 3, 2009.

(51) Int. Cl.
*G05B 19/00* (2006.01)
(52) U.S. Cl.
USPC .......................... 700/259; 356/394

(58) Field of Classification Search
USPC .......... 700/259, 264, 254, 255; 382/155, 173, 382/181, 190, 195, 201, 203; 318/567, 318/568.16, 568.19, 568.11, 568.13; 901/47; 348/86–88, 90, 94, 135, 348/152–154, 91, 92, 125, 129, 130; 356/394
See application file for complete search history.

(56) References Cited

U.S. PATENT DOCUMENTS

| 4,724,302 | A |   | 2/1988  | Penney et al.            |
|-----------|---|---|---------|--------------------------|
| 4,907,169 | A | * | 3/1990  | Lovoi ............ 700/259 |
| 5,372,540 | A |   | 12/1994 | Burch et al.             |
| 5,412,300 | A |   | 5/1995  | Meyer et al.             |
| 5,572,103 | A | * | 11/1996 | Terada .......... 318/568.13 |
| 5,959,425 | A |   | 9/1999  | Bieman et al.            |
| 6,763,284 | B2|   | 7/2004  | Watanabe et al.          |

(Continued)

FOREIGN PATENT DOCUMENTS

| CN | 1418761 A | 5/2003 |
|----|-----------|--------|
| DE | 290838 A5 | 6/1991 |

(Continued)

*Primary Examiner* — Dalena Tran
(74) *Attorney, Agent, or Firm* — Fraser Clemens Martin & Miller LLC; William J. Clemens

(57) ABSTRACT

A method of controlling a robot system includes the steps of providing a tool supported by a moveable mechanism of the robot system, providing a workpiece supported by a holder, generating an image of the workpiece, extracting a data from the image, the data relating to a feature of the workpiece, generating a continuous three-dimensional path along the workpiece using data extracted from the image, and moving the tool along the path.

20 Claims, 4 Drawing Sheets

(56) References Cited

U.S. PATENT DOCUMENTS

| | | | |
|---|---|---|---|
| 6,816,755 B2 * | 11/2004 | Habibi et al. | 700/259 |
| 7,324,873 B2 | 1/2008 | Nagatsuka et al. | |
| RE40,176 E | 3/2008 | Peshkin et al. | |
| 2003/0144765 A1 | 7/2003 | Habibi et al. | |
| 2003/0171840 A1 | 9/2003 | Haupt | |
| 2005/0107920 A1 | 5/2005 | Ban et al. | |
| 2006/0241792 A1 | 10/2006 | Pretlove et al. | |
| 2008/0027580 A1 * | 1/2008 | Zhang et al. | 700/245 |
| 2009/0125146 A1 | 5/2009 | Zhang et al. | |

FOREIGN PATENT DOCUMENTS

| | | |
|---|---|---|
| DE | 102007033309 A1 | 1/2009 |
| JP | 05301182 | 11/1993 |
| JP | 07-084631 A | 3/1995 |
| JP | 11102209 | 4/1999 |
| JP | 2002-172575 A | 6/2002 |
| JP | 2005-149299 A | 6/2005 |

* cited by examiner

METHOD OF CONTROLLING A ROBOTIC TOOL

CROSS-REFERENCE TO RELATED APPLICATION

This application claims the benefit of U.S. provisional patent application Ser. No. 61/149,443 filed Feb. 3, 2009, hereby incorporated herein by reference in its entirety.

FIELD OF THE INVENTION

The present invention generally relates to a method for programming a robot to follow a desired path. More particularly, the invention is directed to a method of controlling a robot system to move a tool along a desired path using visual information to complete a programming process.

BACKGROUND OF THE INVENTION

Industrial robots are increasingly being used for a wider variety of applications. In most instances, it is necessary to "teach" the robot the path along which the robot must move to complete the desired operation. For example, in a welding application, the robot must be programmed to move into a number of successive orientations that will effectively move the welding torch along the seam on the workpiece.

Programming or teaching a robot a desired path conventionally has been carried out manually. An operator interacts with the robot controller and manually causes the robot to move into the necessary orientations for placing the tool into the necessary positions along the desired path. Each of the positions is then programmed into the robot controller, which later repeats the programmed path. The process is typically time-consuming, difficult and often not accurate enough to yield satisfactory results at the end of the robot operation. Further, the conventional practice includes the drawback of having the operator within the robot work space during the teaching operation, which introduces the possibility for an undesirable collision between the robot and the operator.

Several systems have been proposed that include a robot vision system for controlling robot operation. None, however, have used the vision system to teach or program the robot to follow the program path. For example, U.S. Pat. Nos. 4,616,121; 4,965,499; and 5,572,103 each include a vision system associated with an industrial robot that provides visual information for making corrections to a preprogrammed path during robot operation. Such systems have been proposed for accommodating deviations between an actual desired path and a preprogrammed path that the robot is following. In each of these systems, however, it is necessary to preprogram the robot in the conventional manner. Shortcomings of prior art are that for each part being processed the user has to explicitly teach a program.

Seam tracking can also be used to program a robot system. U.S. Pat. No. 4,812,614 describes a machine vision seam tracking method and apparatus for welding robots. The apparatus can automatically detect the deviation between an actual welding seam and a taught path where the apparatus, so as to correct the welding path, comprises an image forming means and an image processor. Through the image forming means, a light coming from a common light source, after being condensed and transmitted, can be projected onto a workpiece to form a line of light across the welding seam. A solid state camera disposed along the direction of the welding seam can detect the image of the welding seam which in turn is transmitted to the image processor. The image processor preferably is a microcomputer which comprises software for processing the images respectively formed by the butt, fillet, lap and V-groove joints so as to calculate the deviation, including the positional error across the welding seam as well as the distance variation between the welding torch and the workpiece (the so called height of the welding torch), existing between the actual welding seam and the taught path. A controller of the welding robot can convert the error signals of the welding path into the corresponding data by which the coordinates of the welding robot can be corrected to align with the actual welding seam.

However, seam tracking requires a taught path or taught program, wherein the whole continuous taught path is offset in response to a detected deviation from the taught path.

As another example of the prior art, robots can also be made to move along a path comprised of points that are available in CAD data that describes the part (i.e. CAD-to-Path). In CAD-to-Path programming, a robot path is adjusted using real-time information provided in the form of visual stimulus. However, shortcomings of CAD-to-Path include: 1) The CAD-to-Path algorithm takes too much time to execute; 2) Is too costly to produce; 3) It does not allow the robot position to be altered based upon inaccurate part placement; and 4) It does not allow for tracing manually drawn reference points or lines.

There is a need to simplify and improve current robot path teaching methods. For example, it is desirable to eliminate the need for the operator to be within the robot work envelope during the path training procedure. Additionally, it is desirable to improve efficiency in teaching a robot path by reducing the amount of time required.

SUMMARY OF THE INVENTION

Concordant and consistent with the present invention, a method of controlling a robotic tool, using visually acquired information regarding a workpiece, has surprisingly been discovered.

The present invention addresses the needs described above, while avoiding the shortcomings and drawbacks of the prior art, by providing a means to synthesize a robot program entirely from information extracted from an input image and a robot calibration data.

The invention provides methods of controlling a robot system.

One method comprises the steps of:
  a. providing a tool supported by a moveable mechanism of the robot system;
  b. providing a workpiece supported by a holder;
  c. generating an image of the workpiece;
  d. extracting a data from the image, the data relating to a feature of the workpiece;
  e. generating a continuous three-dimensional path along the workpiece using data extracted from the image; and
  f. moving the tool along the path.

Another method comprises the steps of:
  a. providing a tool supported by a moveable mechanism of the robot system;
  b. providing a workpiece supported by a holder;
  c. calibrating the moveable mechanism to the holder;
  d. generating an image of the workpiece;
  e. extracting a data from the image, the data representing a feature of the workpiece;
  f. assigning a node to each of a plurality of points along the feature of the workpiece using data extracted from the image and data from the calibration of the moveable mechanism;

g. generating a continuous three-dimensional path along the nodes; and h. moving the tool along the path.

Yet another method comprises the steps of:

a. providing a tool;

b. providing a workpiece;

c. applying a guide line to the workpiece;

d. extracting a data relating to a feature of the workpiece;

e. locating the workpiece;

f. generating an ideal path of the tool along the workpiece using the extracted data;

g. moving the tool along at least a portion of the ideal path; and h. adjusting a position of the tool to follow the guide line.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
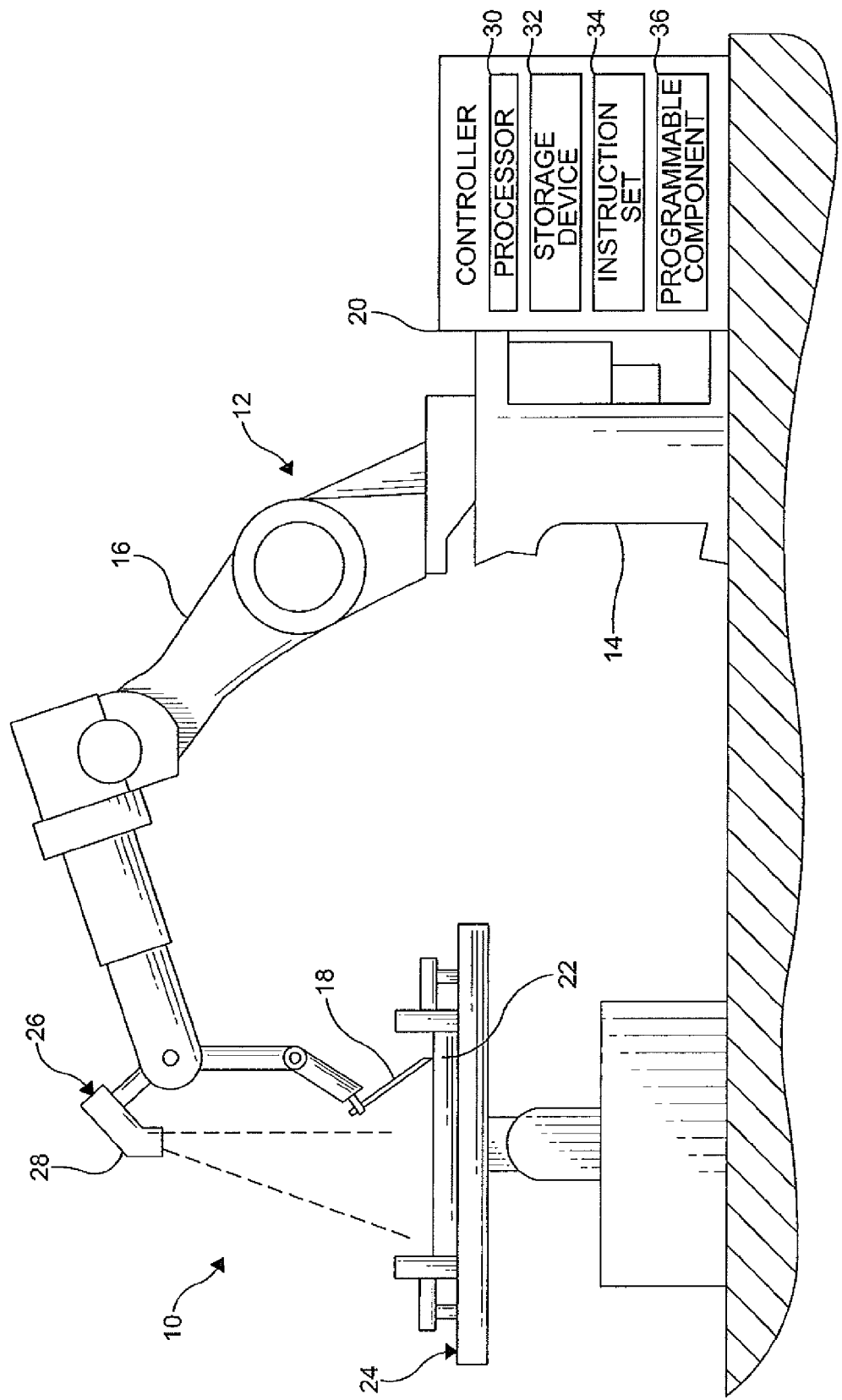
FIG. 1 is a schematic representation of a robot system according to an embodiment of the present invention.

FIG. 1 illustrates a robot system 10 including a robot 12 having a robot base 14 and a moveable arm 16 supported on the base 14. One end of the arm 16 supports a tool 18 that is used to perform a desired operation. For example, the tool 18 could be any of a welding torch, a plasma cutting tool, a material removal/deburring tool, and a coating tool/applicator for applying a sealant or paint. It is understood that any robotic tool can be used.

A controller 20 is adapted to control a movement of the robot arm 16 so that a desired operation is performed on a workpiece 22. The workpiece 22 is supported by a conventional workpiece holder 24 within the robot work envelope. As a non-limiting example, the holder includes a planar table. However, any holder or support device can be used.

A vision system 26 is disposed to capture an image of at least the workpiece 22. In the embodiment shown, the vision system 26 includes a three-dimensional laser vision sensor 28 (e.g. iRVision® sensor manufactured by FANUC Robotics America, Inc.) supported on the robot arm 16 and able to move therewith. However, the vision system 26 can include a two-dimensional digital camera (not shown) capable of viewing the workpiece 26 and collecting data representing an image of what is observed by the camera. A variety of sensors and cameras are commercially available and those skilled in the art will be able to choose one to satisfy the needs of a particular situation.

As a non-limiting example, the vision sensor 28 generates a two-dimensional image. However, it is understood that the vision sensor 28 can be adapted or oriented to generate a three-dimensional representation of the workpiece 22. As shown, the vision sensor 28 is in communication with the controller 20 so that the image information obtained by the vision sensor 28 can be processed as described below.

In certain embodiments, the controller 20 includes a processor 30 and a storage system or device 32. The processor 30 is adapted to analyze the images captured by the camera 28 or other data received from components of the vision system 26 based upon an instruction set 34. The instruction set 34, which may be embodied within any computer readable medium, includes processor executable instructions for configuring the processor 30 to perform a variety of tasks.

As a non-limiting example, the instruction set 34 includes an image analysis code or algorithm to evaluate an image of the workpiece 22 and extract information relating to edges and other features of the workpiece 22, wherein features can include any area or edge residing on workpiece 22 that may form any shape, complex or simple, or contour, for example. It is understood that a feature can be broken into segments and an individual segment can be broken into multiple sub-segments. When creating a program or path from the feature, different creation properties can be given to each segment of the feature to generate desirable robot process programs.

It is understood that a feature can be extracted from computer aided drawings (i.e. CAD Edges) or generated by user input such as mouse clicking on a surface of a computer aided drawing to create a node by node line or path.

The storage system 32 may be a single storage device or may be multiple storage devices. Portions of the storage system 32 may also be located on the processor 30. Furthermore, the storage system 32 may be a solid state storage system, a magnetic storage system, an optical storage system or any other suitable storage system. It is understood that the storage system 32 is adapted to store the instruction set 34. Other data and information may be stored in the storage system 32 such as a buffered data, for example.

The controller 20 may further include a programmable component 36. The programmable component 36 is in communication with the processor 30. It is understood that the programmable component 36 may be in communication with any other component of the robot system 10 or vision system 26, for example. In certain embodiments, the programmable component 36 is adapted to manage and control processing functions of the processor 30. The programmable component 36 provides a means for a user to actively manage the operation of the processor 30 and thereby control functionality of the robot system 10 and the vision system 26.

Figure 2:
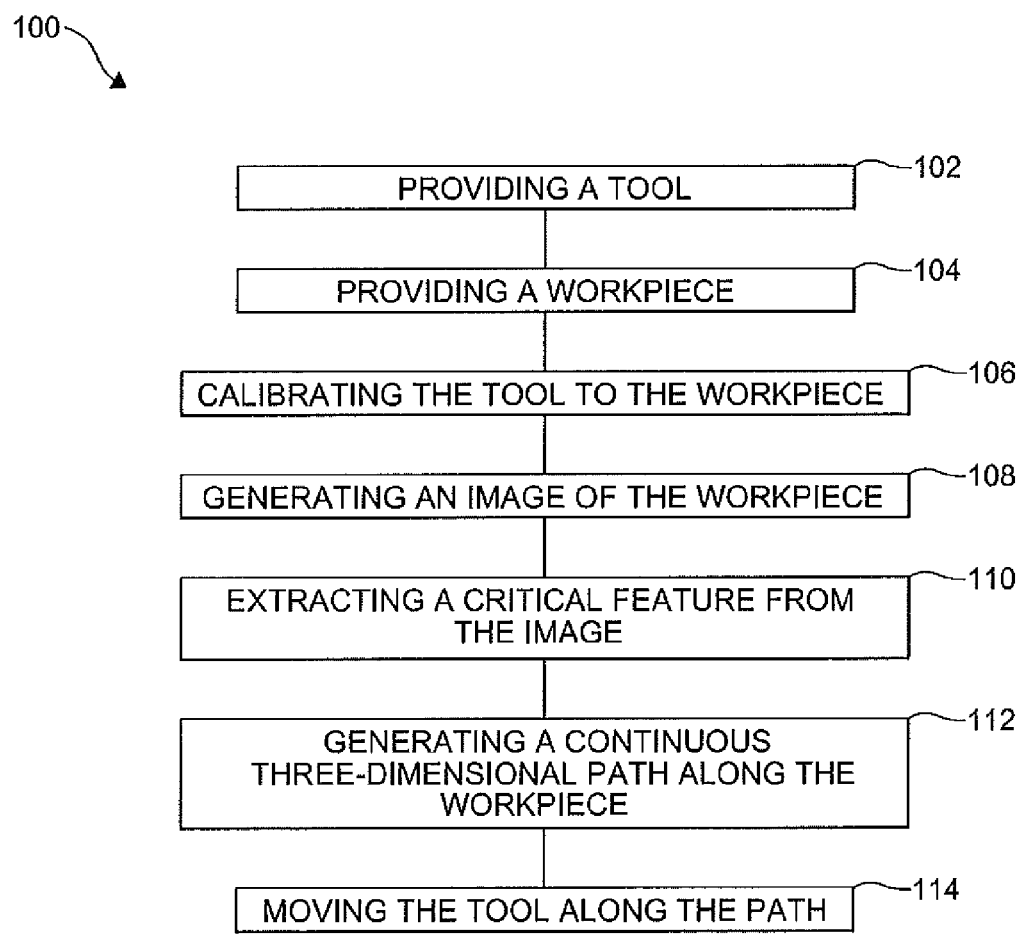
FIG. 2 is a schematic flow diagram of a method for controlling the robot system of FIG. 1, according to an embodiment of the present invention.

FIG. 2 illustrates a method 100 of controlling the robot system 10 according to the present invention. In step 102, the tool 18 is disposed on the moveable arm 16 of the robot system 10. In step 104, the workpiece 22 is disposed on the holder 24. As shown in step 106, once the workpiece 22 is in position, the arm 16 of the robot system 10 and the tool 18 are calibrated based upon a position and orientation of the holder 24 relative to the arm 16. As a non-limiting example, the arm 16 is calibrated to the holder 24 using a three-dimensional calibration grid frame to establish a coordinate system for determining relative position and orientation of various components. It is understood that a data representing the calibration step can be stored for subsequent use.

In step 108, the vision system 26 generates an image of the workpiece 22. As a non-limiting example, the image is a two-dimensional image. However, other images can be generated. The image is transmitted to the controller 20 for extracting information relating to a critical feature or edge represented in the image.

The controller 20 processes the critical features of the image along with the calibration data retrieved from step 106 to generate a continuous three-dimensional path along the workpiece 22, as shown in steps 110 and 112 respectively. As a non-limiting example, the processor 30 analyzes the image based upon an image processing method known in the art. As a further example, the processor 30 analyzes the image to define a plurality of edges of the workpiece 22 and interpolates/extrapolates the defined edges to fit to a plurality of features, thereby forming a geometrical profile of the workpiece 22.

In certain embodiments, each edge or feature detected by the processor 30 is assigned a unique identification and a specific length value. Points of the feature or edge are each represented by a node based upon pre-determined settings of the processor 30. For example, data relating to each node may include the following information fields: $contrast—magnitude of a gradient of the node toward a pre-determined detectable characteristic of the image (e.g. light, reflectance); $edge_len—length of the edge with which the node (feature point) is associated; $edge_id—numeric identification of a chain of associated nodes, wherein each chain has a different identification; and $position—standard XYZWPR position, wherein an X-coordinate of the node is located in the image based on the calibration grid frame, a Y-coordinate is found in the image based on the calibration grid frame, a Z-coordinate in the calibration grid frame is determined from at least one of a user input or an image analysis (based on a three-dimensional image), and an R-angle of the gradient pointing toward a "light side" of the node, wherein the angle is in radians based on the calibration grid frame.

The edge length ($edge_len) and edge identification ($edge_id) are the same value for every node associated with a particular chain, wherein all nodes having the same edge identification ($edge_id) represent a continuous path along an edge or feature of the image. It is understood that the number of nodes/points in the path is determined based on pre-defined settings of the processor 30.

In certain embodiments, a user manually provides any number of image points (nodes) that are not readily detected by the processor 30. A user can provide a secondary model of a third dimension not represented by the image via prior knowledge of an expected geometry of the workpiece 22. A user can teach key three-dimensional features of the workpiece 22, by providing a user input to the processor 30.

In certain embodiments, the processor 30 generates the three-dimensional path based upon a curve fitting process that generates a point data based on a rate of change between features or along an edge in a pre-determined dimension. As a non-limiting example, the curve fitting process is similar to a path blending of the ArcTool® application software produced by FANUC Robotics America, Inc. A data filtering can also be used to eliminate image data that is not relevant or to combine image data for further processing. As a further example, the generated path is modified based upon a process knowledge and process parameters that are specific to a process associated with the tool 18 mounted on the arm 16.

Additional control over the evaluation of the generated image and resultant presentation of nodes and path data is provided by a path location tool which traces each of a plurality of grayscale edges in a search window overlaying the image and outputs multiple points on multiple detected edges. A user is able to configure the path location tool to return either all of the found points on each edge, or a subset of points using the methods described below.

A contrast threshold method includes setting a minimum contrast for a point to be considered. A maximum deviation method includes setting a threshold deviation from a pre-determined "straightedge". A point spacing method includes setting a threshold based upon a distance between consecutive points. Where maximum deviation is used the vision system 26 returns end points of straight segments approximating a particular edge. Where point spacing is used the vision system 26 returns equally spaced points.

Because of the range of applications that are expected to use the methods disclosed herein, multiple existing vision processes must be able to generate the path as described above. For example, in a two-dimensional single-view vision process, the path points are projected to a plane at a fixed Z distance above the calibration grid plane. In a depalletizing vision process, the path points are projected to a plane at a Z distance that can be specified by a register value. In a floating frame vision process, the path points are projected to a plane that moves with the viewing position of a robot-mounted camera. In a three-dimensional laser single-view vision process, a laser sensor first measures the plane and then the path points are projected to the measured plane. In a three-dimensional cross section vision process, a laser sensor builds a binary cross section image in which the vertical coordinate represents a distance along a laser line and the horizontal coordinate represents the Z distance to the sensor, wherein a vision system finds the points on the black-white boundary of the cross-section image and returns the X, Y, and Z coordinates of either all or a subset of the points where the laser plane intersects a surface.

In certain embodiments, a pre-taught path is offset by processor 30 based on the generated three-dimensional path. It is understood that a user can select a desired path based upon the analysis of the image.

Once the three-dimensional path is generated, the robot system 10 moves the tool 18 along the path using the critical features to determine a location of the tool 18 along any portion of the path, as shown in step 114. Specifically, the generated path can be used to generate motion commands for the mechanism to trace the path. In certain embodiments, the vision system 26 can provide real-time updates to the controller on a position of the tool 18 relative to the workpiece 22.

Figure 3:
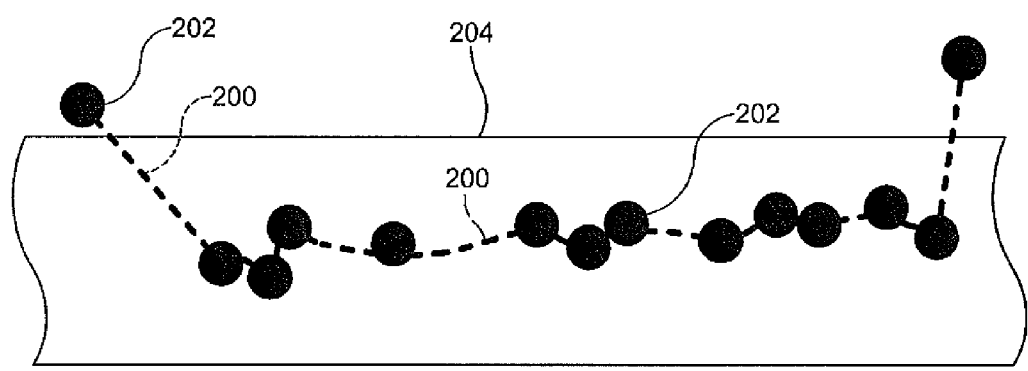
FIG. 3 is a schematic representation of a robot path overlayed on a workpiece according to the method of FIG. 2.
Figure 4:
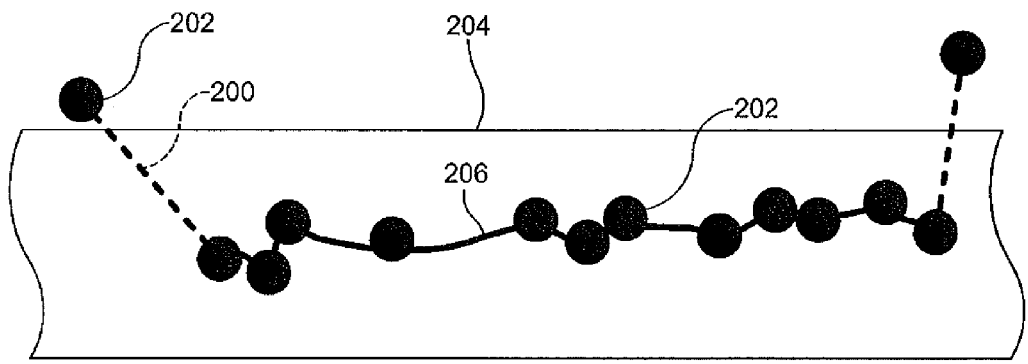
FIG. 4 is a schematic representation of a robot path overlayed on a workpiece according to the method of FIG. 2, showing a weld path on the workpiece that tracks a portion of the robot path.

FIG. 3 illustrates a three-dimensional path 200 generated in accordance with the method 100. As shown, the path 200 includes a plurality of nodes 202 overlayed on a workpiece 204, wherein each of the nodes 202 represents a critical point along a feature of the workpiece 204. It is understood that a "critical point" is selected based upon pre-determined settings discussed herein above. As a non-limiting example, the path 200 represents an actual seam of the workpiece 204 to be welded by a robotic torch. It is understood that when trim dies are not used to cut the workpiece 204, an ideal, consistent, and straight seam is not always possible. The method 100 provides a means to generate the path 200 which identifies and tracks the inconsistent features of the workpiece 204 for a more accurate operation to be performed thereon. As shown in FIG. 4, a tool such as a weld torch can be tracked along the path 200 to apply a weld seam 206 to a portion of the workpiece 204. A feedback position of the torch can be determined based upon a relative tracking of the torch from one node 202 to another.

Figure 5:
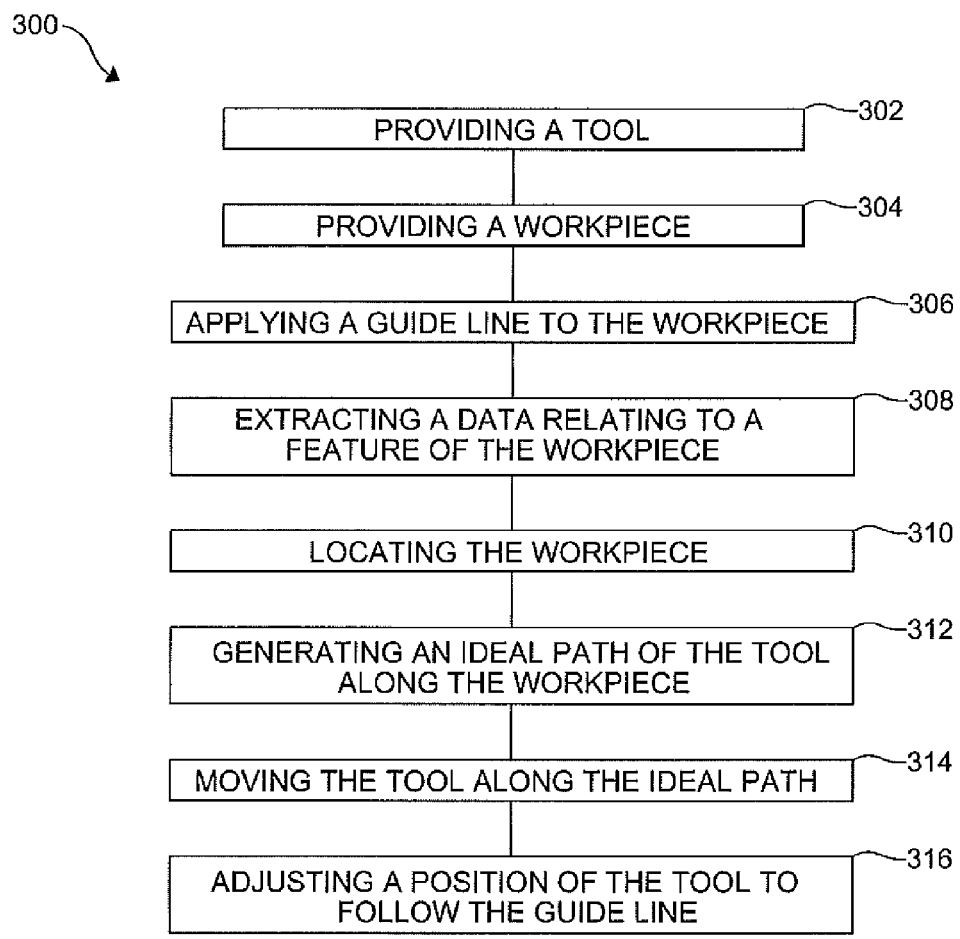
FIG. 5 is a schematic flow diagram of a method for controlling the robot system of FIG. 1, according to another embodiment of the present invention.
Figure 6:
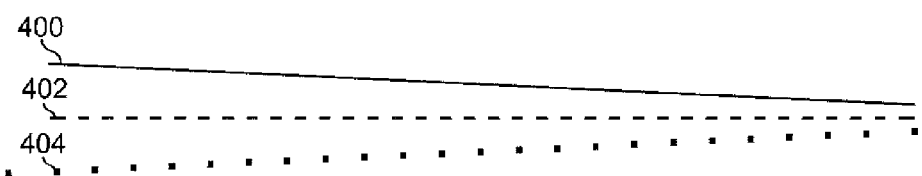
FIG. 6 is a schematic diagram of various paths on a workpiece.

FIGS. 5-6 illustrate a method 300 of controlling the robot system 10 according to the present invention. As a non-limiting example, the method 300 is used for tracking a manually drawn line on a geometrically complex part.

In step 302, the tool 18 is disposed on the moveable arm 16 of the robot system 10. In step 304, the workpiece 22 is disposed on the holder 24. As shown in step 306, a guide line is applied to the workpiece 22. Typically, the guide line is manually drawn on the workpiece 22. However any means of applying the guide line can be used.

In step 308, a data relating to a feature of the workpiece 22 is obtained. In certain embodiments, the vision system 26 generates an image of the workpiece 22. As a non-limiting example, the image is a two-dimensional image. However, other images can be generated. The image is transmitted to the controller 20 for extracting information relating to a critical feature or edge represented in the image. In other embodiments, the data relating to a feature of the workpiece is extracted from a computer aided drawing of an ideal part.

In step 310, the vision system 26 is used to locate the workpiece 22. From at least one of the extracted data relating to a feature of the workpiece and a relative location of the workpiece 22, the processor 30 generates an ideal path for the tool 18 along the workpiece 22, as shown in step 312. In step 314, the tool is initially moved along at least a portion of the ideal path. In step 316, the vision system 26 is used to locate the guide line and adjust a position of the tool 18 to follow the guide line.

The method 300 is explained further when one studies the simple diagram in FIG. 6. As shown, an upper solid line 400 represents the generated ideal path. A center dashed line 402 represents the actual position of the workpiece 22 where a frame is shifted around two points. All intermediate points are assumed to shift accordingly with this new relationship. A lower dotted line 404 represents the drawn guide line position on the workpiece 22. All point data created previously is preserved, with the exception of the Y position (deviation) of the line.

As a non-limiting example, three functional application groups are required to facilitate the method 300: 1) a part position reference frame is shifted based on a pair of three-dimensional points that are found using the machine vision system 26 (i.e. A_CREATE_FRAME), wherein a segment start and end points are found in a robot coordinate space and trigonometric functions use the start/end points to define a new frame that rectifies the spatial relationship between the actual workpiece 22 and a model thereof; 2) a computer aided drawing (CAD) data is created that contains a sequence of points that characterize the ideal path and tool angle along the created frame (i.e. A_EMULATE_CAD), wherein at least one of a plurality of path points for an active segment are plotted with X, Y, and Z points sampled at a fixed pitch, the vision system 26 is placed in a fixed proximity to view the drawn guide line, and a proper tool cutting information (roll, pitch, yaw, altitude) is provided; and 3) the guide line is "traced" while moving the tool 18 through the positions and changing only Y position which corresponds to the found line (i.e. A_MOVING_LINE_TRACK), wherein a smooth movement requires finding the line position through a call to the vision program on-the-fly.

In certain embodiments, an A_CREATE_FRAME.TP program generates a new frame reference that will guide the tracing routine position. As a non-limiting example, an iRVision® 3DL system manufactured by FANUC Robotics America, Inc. is used to find the start and stop positions with respect to X, Y, and Z. A vision program locates the start position. Then there is a move to the found position, and refining of the position while extracting the Z height. This process is duplicated for the end position. A trigonometric function creates a frame from two points; the origin and the X axis point, The new frame is in a plane formed by the O to X and the User frame Z axis is inherited. In summary, the A_CREATE_FRAME.TP program looks at a section of the workpiece 22, and creates a frame that is (0,0,0) at the start, and (X,0,0) at the end. The incoming descriptive part data is normalized to this frame, and individual path points and tool angles deviate from this line (frame).

In certain embodiments, an A_EMULATE_CAD.TP program generates a simulated CAD data for the workpiece 22 through use of an iRVision® "Cross Section Analysis Tool". Specifically, individual points are extracted in X, Y and Z, with respect to a frame (normalized to the start and end points of the current section within "A_CREATE_FRAME").

The A_EMULATE_CAD.TP program locates the start of the section, and then moves a 3D camera to the starting point. A Cross Section Program extracts X, Y, Z position that the profile of the laser line, and finds the desired geometric relationship or junction. All points are stored, and counters are used to keep track of how many intervals are contained in this section. Once the laser profile position is found, the tooling is moved forward a set increment, before the next Cross Section is scrutinized.

In summary, the A_EMULATE_CAD.TP program creates data points relative to the reference frame, that include the X, Y, Z and tool W, P, R values to simulate the feature segment data format that is similar to the data that is generated by the CAD-To-Path feature in the FANUC® RoboGuide program. The point data will be used to create the ideal path, with only the Y value changing (based upon where vision finds the manually placed guide line).

In certain embodiments, an A_MOVING_LINE_TRACK program extracts points from the CAD data that is normalized relative to the current section. The A_MOVING_LINE_TRACK program first loads the starting position and positions the vision system 26 over a flash to detect the position of the drawn guide line. The vision system 26 is then positioned at a fixed height over the next line segment. A machine vision program runs in the background to locate the actual position of the guide line. The found position of the guide line is used to update a position of the arm 16 and tool 18 relative to the workpiece 22 by allowing tool 18 to shift in only one direction. In this way, the guide line can be tracked while moving and update a position of the tool 18, on the fly. In summary, A_MOVING_LINE_TRACK program uses a foundation of points to follow the ideal path. The vision system 26 updates the path position (Y value only) as the tool 18 travels through all the points.

The robot system 10 and methods 100, 300 provides a means to control the robotic tool 18 by synthesizing a robot program entirely from information extracted from an image of the workpiece 22 and a robot calibration data. The methods can be applied to a variety of robotic tools and operations.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method of controlling a robot system, the method comprising the steps of:

a. providing a tool supported by a moveable mechanism of the robot system;
b. providing a workpiece supported by a holder and providing to a processor a feature of the workpiece;
c. generating an image of the workpiece to the processor;
d. the processor extracting a data from the image, the data relating to the feature of the workpiece;
e. the processor generating a continuous three-dimensional path along the workpiece using data extracted from the image; and
f. controlling the robot system to move the tool along the generated path.

2. The method according to claim 1, wherein the image is a two-dimensional image.

3. The method according to claim 2, further comprising the step of providing image points which constitute a three-dimensional data not readily detectable in the two-dimensional image.

4. The method according to claim 2, further comprising the step of providing a secondary model of a third dimension of the workpiece not readily detectable in the two-dimensional image via prior knowledge of an expected geometry of the workpiece.

5. The method according to claim 1, wherein the image is generated by a three dimensional vision sensor.

6. The method according to claim 1, further comprising the step of manually teaching a point on the path.

7. The method according to claim 1, where the generated path is used to generate motion commands for the mechanism to trace the path.

8. The method according to claim 1, further comprising the step of offsetting a pre-set path based upon at least one of the data extracted from the image and the generated path.

9. The method according to claim 1, wherein the path is overlayed on the feature of the workpiece.

10. The method according to claim 1, further comprising the, step of filtering the data extracted from the image.

11. The method according to claim 10, wherein the step of filtering the data is based upon at least one of a contrast threshold, a maximum deviation, and a point spacing.

12. A method of controlling a robot system, the method comprising the steps of:
a. providing a tool supported by a moveable mechanism of the robot system;
b. providing a workpiece supported by a holder;
c. calibrating the moveable mechanism to the holder and providing to a processor a feature of the workpiece;
d. generating an image of the workpiece to the processor;
e. the processor extracting a data from the image, the data representing the feature of the workpiece;
f. the processor assigning a node to each of a plurality of points along the feature of the workpiece using data extracted from the image and data from the calibration of the moveable mechanism;
g. the processor generating a continuous three-dimensional path along the nodes; and
h. controlling the robot system to move the tool along the generated path.

13. The method according to claim 12, wherein the image is generated by a three dimensional vision sensor.

14. The method according to claim 12, further comprising the step of providing a secondary model of a third dimension of the workpiece not readily detectable in the two-dimensional image via prior knowledge of an expected geometry of the workpiece.

15. The method according to claim 12, further comprising the step of manually teaching a point on the path.

16. The method according to claim 12, where the generated path is used to generate motion commands for the mechanism to trace the path.

17. The method according to claim 12, wherein data relating to each node includes at least one of a magnitude of a gradient of the node, a length of the feature with which the node is associated; a numeric identification of a chain of associated nodes, and a position of the node in a pre-defined coordinate system.

18. A method of controlling a robot system, the method comprising the steps of:
a. providing a tool moveable by the robot system;
b. providing a workpiece;
c. applying a guide line to the workpiece;
d. extracting a data relating to a feature of the workpiece with a processor;
e. locating the workpiece;
f. the processor generating an ideal path of the tool along the workpiece using the extracted data;
g. controlling the robot system to move the tool along at least a portion of the ideal path; and
h. controlling the robot system to adjust a position of the tool along the ideal path to follow the guide line.

19. The method according to claim 18, wherein the step of locating the workpiece is executed by a Vision system.

20. The method according to claim 18, wherein the data relating to a feature of the workpiece is extracted from a computer aided drawing data for an ideal part.

* * * * *